Aug. 14, 1928.
A. J. KERCHER
1,680,621
ELECTRIC HEATING UNIT
Filed Oct. 6, 1925    2 Sheets-Sheet 1
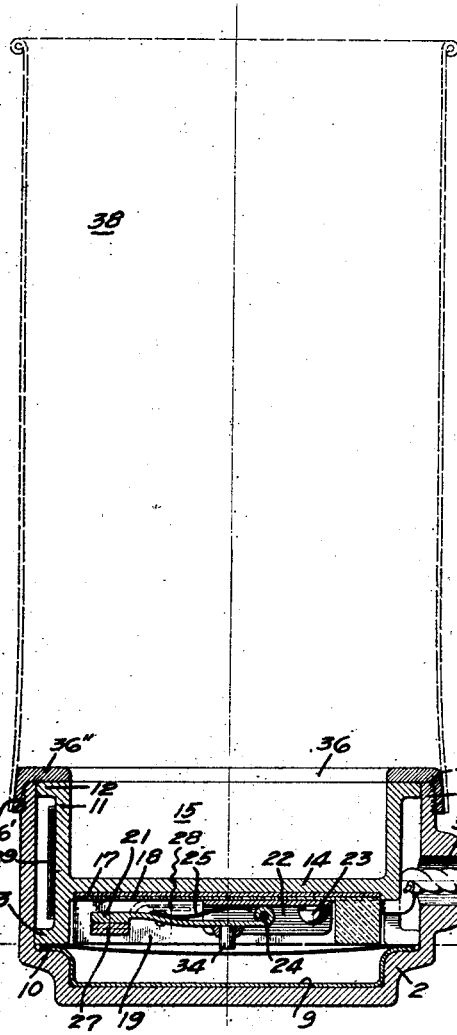
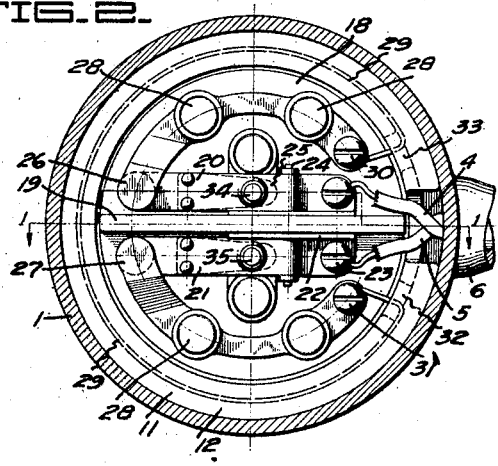
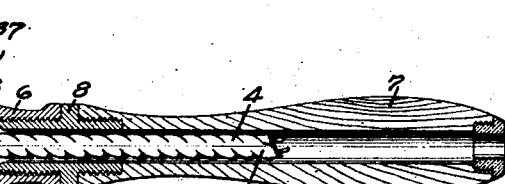
INVENTOR
Arthur J. Kercher
BY White &...
his ATTORNEYS Aug. 14, 1928.  
A. J. KERCHER  
1,680,621  
ELECTRIC HEATING UNIT  
Filed Oct. 6, 1925   2 Sheets-Sheet 2

INVENTOR  
Arthur J. Kercher  
BY  
his ATTORNEYS.

Patented Aug. 14, 1928.

1,680,621

UNITED STATES PATENT OFFICE.

ARTHUR J. KERCHER, OF BERKELEY, CALIFORNIA, ASSIGNOR OF ONE-HALF TO WILLIAM WESLEY HICKS, OF SAN FRANCISCO, CALIFORNIA.

ELECTRIC HEATING UNIT.

Application filed October 6, 1925. Serial No. 60,741.

This invention relates to a thermostatically controlled electric heating unit and has for its object the provision of a simple, compact and efficient device of this character which may be used as an ordinary heater for heating containers and the like in the open air, and which may also be used as an immersion heating unit by placing the same within the water or other fluid to be heated. Heretofore, it has not been possible to use electric heating units for both of these purposes, because they were neither intended for nor adapted for such use and primarily because such units designed as immersion heaters were likely to become overheated and burn out when not immersed.

The invention possesses other advantageous features, some of which with the foregoing will be set forth at length in the following description where I shall outline in full that form of the invention which I have selected for illustration in the drawings accompanying and forming part of the present specification. In said drawings I have shown one form of said device, but I do not desire to be limited thereto, since the invention as expressed in the claims may be embodied in a plurality of other forms.

Referring to the drawings:

Fig. 1 is a vertical sectional view of one form of heating unit embodying my invention, with a container to be heated shown thereon, the same being taken on the line 1—1 of Fig. 2.

Fig. 2 is a sectional view taken on the line 2—2 of Fig. 1 illustrating the switch mechanism and electrical connections;

Fig. 3 is a side elevation of one of the elements comprising the unit.

Figure 6:
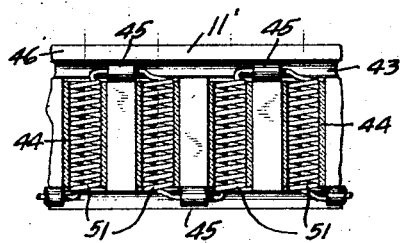
Fig. 6 is a sectional view illustrating the arrangement of the heating coils in the modified unit shown in Figs. 4 and 5.

The invention comprises a cup-shaped element 1, which is preferably circular in cross-section as shown, but which of course may assume other forms. The element 1 is made of a good heat conducting metal, preferably aluminum. The bottom of the element 1 is preferably smaller in diameter, and this smaller portion is united with the larger portion by a circular shoulder 2. An opening 3 is provided in the side of the element 1 through which electric conductors 4 and 5 may enter the same. An internally threaded neck or collar 6 is formed around the opening 3 and a hollow handle 7, through which conductors 4 and 5 extend, is secured to the collar 6 by means of a threaded element 8 which makes a water-tight connection, as shown in Fig. 1. In the small bottom portion of the cup-shaped element 1, I provide a thermal responsive device, such as a pressure cell 9. This cell is preferably formed of thin resilient metal such as copper or phosphor bronze, and contains a readily volatilizable liquid, which is held therein in an air-tight manner. The cell 9 is designed to fit closely within the small portion of the element 1 and to make good contact with the base of said element. The cell 9 is provided with a flange 10 which rests on the shoulder 2. I also provide a cylindrical element 11, shown in Fig. 3, which is also of good heat conducting material, preferably aluminum. This element is of smaller diameter than the cup-shaped element 1 and has at each end a circular flange, indicated at 12 and 13 which correspond in size to the inside diameter of the element 1 so that the same will closely fit therein as shown in Fig. 1. A transverse wall 14 divides the cylinder 11 into two chambers 15 and 16, the lower chamber 16 being the smaller of the two and of sufficient size snugly to accommodate a switch mechanism controlled by the pressure cell 9. This mechanism comprises a metallic base 17 covered on one side, namely the lower side when in position in the unit, with suitable insulating material, 18 preferably mica, and a ridge 19 of insulating material preferably divides the base diametrically as shown in Fig. 2. Movable contacts 20 and 21 are positioned on opposite sides of the ridge 19, and are respectively connected with conductors 4 and 5. As both contacts are similar in construction, a description of one will be sufficient. As shown in Fig. 1, each contact comprises a conducting plate 22, secured to the base 17 by a screw 23, which pivotally supports the contact at 24 and is normally urged in one direction by a spring 25. Cooperating fixed contacts 26 and 27 are provided which are more or less arc-shaped and secured to the base 1 by suitable means such as bolt 28. A heating element 29 surrounds the cylindrical element 11 and is positioned closely against the same between the end flanges 12 and 13. One end of the heating element is connected with fixed contact 26 by means of a screw 30 and the other end thereof is connected with fixed contact 27 by means of a screw 31. Preferably the element 11 is provided with suitable openings 32 and 33 through which the ends of the heating element 29 may enter the chamber 16. The fixed contacts 26 and 27 are positioned below the movable contacts 20 and 21 respectively so that the latter are normally urged against the former by the springs 25 to closed position. The movable contacts 20 and 21 are provided with projections 34 and 35 respectively arranged to engage with the pressure cell 9. When assembling the unit, the pressure cell is placed within the cup-shaped element 1, after which the cylindrical element 11 with the switch mechanism are placed on top of the pressure cell 9, and the same are held within the element 1 by means of a ring-shaped member 36 which is secured thereto so as to make a water-tight closure. The member 36 is suitably threaded to engage external threads 37 near the edge of the member 1. The exterior surface 36' of the member 36, which surrounds the member 1, preferably tapers outwardly from the edge of member 1. The member 36 is also formed with a flat portion 36'' substantially at right angles to the part 36' and adapted to extend over the flange 12. The unit described may be used as an immersion heater, or as an ordinary heater in which case cooking containers, such as indicated at 38, may be positioned thereon. In Fig. 1, the container 38 is shown as an open ended tubular element, the lower end of which is tapered outwardly. The container 38 is placed in position by simply pushing it down over the tapered edge 36' described. When the unit is in operation and sufficient heat is imparted to cell 9, it is caused to expand due to the liquid pressure within the same and by means of projections 34 and 35 raise contacts 20 and 21 from contacts 26 and 27 respectively, thus opening the circuit of the heating element 29. After the proper temperature has been restored, the several parts assume their normal position as shown in Fig. 1.

Figure 7:
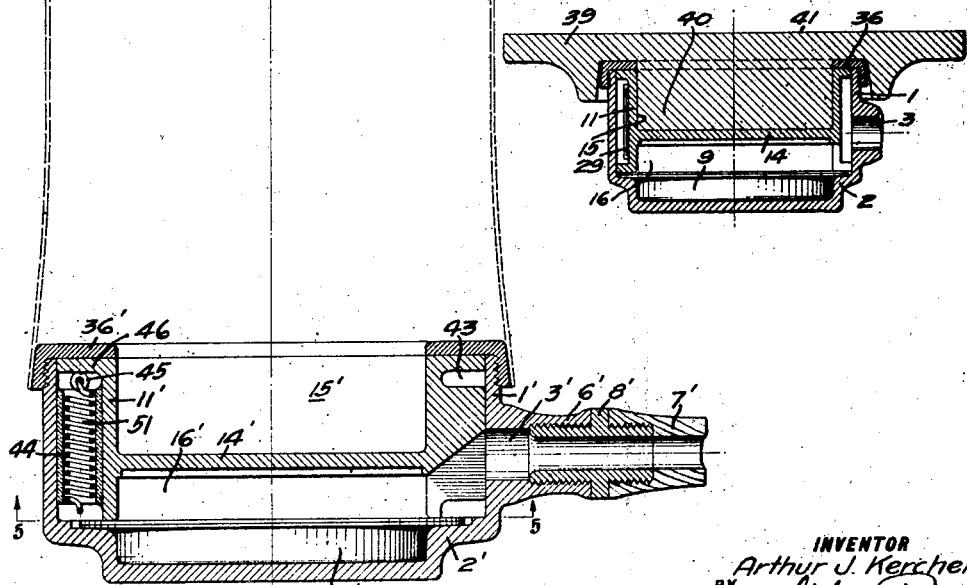
Fig. 7 is a sectional view of the heating unit shown in Figs. 1 to 3, the switch mechanism and connections being omitted, illustrating a flat heating element heated thereby, which may either be used as a hot plate or a sad-iron.

In Fig. 7, I have shown the unit described used as an ordinary heater for heating a metallic element 39. In this drawing, I have omitted the switch mechanism for the sake of simplicity. The element 39 is formed with a projection 40 on its back adapted to fit snugly in the chamber 15 of the cylinder 11 so as to be in good thermal contact therewith, and with an enlarged flat face 41. The element 39 may thus be used as a hot plate for heating and cooking purposes or it may be used as a sad-iron in a manner readily understood.

Figure 5:
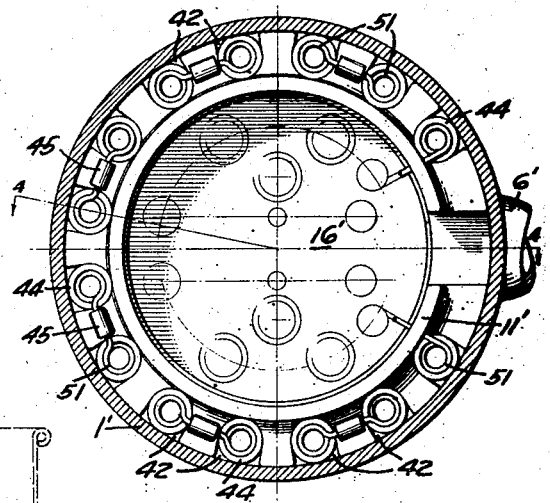
Fig. 5 is a sectional view taken on the line 5—5 of Fig. 4.
Figure 4:
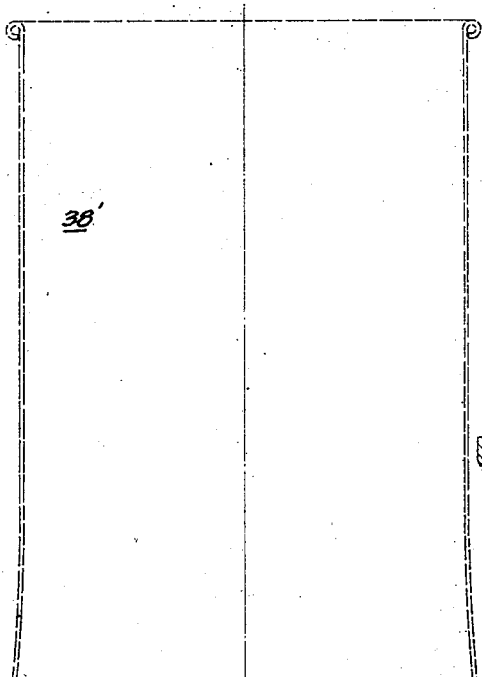
Fig. 4 is a view similar to Fig. 1 of a modified form of heating unit embodying my invention taken on the line 4—4 of Fig. 5; the switch mechanism being omitted.

In Fig. 4, I have shown a heating unit in all respects similar to the unit shown in Fig. 1 excepting as hereinafter pointed out, the several corresponding parts having been given similar reference numerals primed. In this figure, I have also omitted the switch mechanism and electrical connections, which are the same as those shown in Fig. 1. Instead of using a flat heating element 29 as shown in Fig. 1, in the present form of my invention, I use a coiled heating element, which comprises a plurality of heating coils 41. To accommodate these coils, the wall of the cylindrical member 11' is thickened, and formed with a plurality of vertical recesses 42, which extend from the bottom edge of the cylinder wall to a continuous recess or groove 43 near the upper edge of said cylinder wall. The recesses 42 are more in the nature of radial slots on the periphery of the cylinder wall so that the heating coils may readily be positioned in the same by simply slipping the coils into the side of the wall, and are of a suitable size to receive small insulating sleeves 44 which surround the coils 41. The coils are of course placed in the insulating sleeves before the same are positioned in the cylindrical element. As shown in Fig. 6, the coils 41 are arranged in pairs connected together at one end, and the adjacent coils of such pairs are connected together at their opposite ends. Small insulating sleeves 45 are provided for the portion of the heating element connecting the coils. The portion of the cylindrical wall between the recesses or slots 43 is preferably cut away sufficiently to form a bed for the sleeves 45. While the slots 42 could extend through to the upper edge of the cylindrical wall, the groove 43 is preferably provided to which the slots 42 extend so that a solid flange 46 is formed on the upper edge which provides a better surface for making a leak-tight joint with the securing ring 36'. From this it will be seen that means are provided for a coiled heating element, in which the heating element may readily be positioned, and which means may readily be cast of aluminum or other suitable metal. The ends of the heating element in Figs. 4 to 6 are connected to terminals of the switch mechanism in the same manner as described in connection with Figs. 1 to 3.

I claim:

1. In an electrical heating appliance, a metallic casing adapted to dissipate heat to a surrounding medium, an electrical heating element within said casing, a metallic body extending within said casing adapted to absorb the major portion of the heat from said element, a metallic temperature responsive element, said element being in thermal contact with both said casing and said body whereby it forms a path for heat flow from the body to the casing, and a switch adapted to be actuated by said element.

2. In an electrical heating appliance, a metallic casing adapted to dissipate heat to a surrounding medium, an electrical heating element within said casing, a metallic body extending within said casing adapted to absorb the major portion of the heat from said element, a pressure cell having metallic walls of good heat conductivity, said cell being positioned within the casing in such a manner that said walls are included in a path for conduction of heat from the body to the casing, and a switch within the casing adapted to be operated by the cell.

3. In an electrical heating appliance, a metallic casing adapted to dissipate heat to a surrounding medium, an electrical heating element within said casing, a metallic body extending within said casing and adapted to absorb the major portion of the heat from said element, a pressure cell having metallic walls of good heat conductivity, said walls being in physical contact with both said body and the casing whereby they form a path for conduction of heat from the body to the casing, and a switch within the casing adapted to be operated by the cell.

4. In an electrical heating appliance, a metallic casing adapted to dissipate heat to a surrounding medium, an electrical heating element within the casing, a metallic body extending within said casing and adapted to absorb the majority of the heat from said element and secured to the casing, a pressure cell having walls of good conductivity, one of said walls being in close thermal contact with the casing and a peripheral portion of the cell being in physical contact with said body, whereby the cell forms a path for flow of heat from the body to the casing, and a switch actuated by said cell.

5. In an electrical heating appliance, a cup-shaped casing, a heating element within the casing, a heat absorbing body secured to and serving to close said casing, said body being adapted to absorb the major portion of the heat developed by the element, a pressure cell within the casing, said cell comprising spaced walls of good heat conducting material, one of said walls being in close thermal contact with the bottom of the casing and the other of said walls being in close thermal contact with said body whereby the cell forms a path for heat flow from the body to the casing, and a switch within the casing adapted to be actuated by the cell.

6. In an electrical heating appliance, a metal casing adapted to dissipate heat to a surrounding medium, an electrical heating element within the casing, a metallic body extending within the casing and adapted to absorb the majority of the heat from said element, a pressure cell, said cell having spaced walls of good heat conductivity secured together at their peripheries, said cell being positioned with one wall in close thermal contact with the casing and with its peripheral portion in close thermal contact with the heat absorbing body whereby the cell forms a path for heat flow, and a switch within the casing actuated by said cell.

7. In an electrical heating appliance comprising a metal casing adapted to be immersed in a liquid, a heating element within the casing, a heat absorbing body secured to the casing and serving to absorb the majority of heat from the element, said body having substantially less area exposed to the liquid than the casing, a thermal responsive element within the casing in thermal contact with both said body and the casing whereby it forms a path for heat flow from the body to the casing, and a switch within the casing actuated by said thermal responsive element.

8. A heating unit comprising a metallic cup-shaped casing, a pressure cell positioned in the bottom of the casing and in close thermal contact therewith, a cylindrical member within said receptacle having a transverse wall enclosing a chamber in the lower portion of the casing, said member being positioned on top of said cell and in thermal contact therewith, a heating element surrounding said cylindrical element, a switch in circuit with said heating element located in said chamber and controlled by said pressure cell and means for securing said cylindrical member within said receptacle.

9. In an electric immersion heater, a handle, a casing secured to said handle, a cup shaped body disposed within said casing, the bottom of said body defining a chamber between the same and a portion of the casing, an expansible cell disposed within said chamber, means for clamping the periphery of said cell between portions of said casing and body, electrical heating means disposed between the casing and body and in good thermal contact with the body, and means for sealing the space between said casing and body, said means serving to force said body against said cell.

In testimony whereof, I have hereunto set my hand.

ARTHUR J. KERCHER.